United States Patent [19]
Inaba et al.

[11] Patent Number: 5,127,470
[45] Date of Patent: Jul. 7, 1992

[54] APPARATUS FOR HEAT RECOVERY AND METHOD FOR OPERATING THE APPARATUS

[75] Inventors: Yoshiaki Inaba, Hitachi; Kenji Tokunaga, Tokyo; Akihiro Shimizu; Tetsuzo Kuribayashi, both of Hitachi, all of Japan

[73] Assignees: Hitachi Ltd., Tokyo; Hitachi Engineering Co., Ltd., Ibaraki, both of Japan

[21] Appl. No.: 565,683

[22] Filed: Aug. 9, 1990

[30] Foreign Application Priority Data

Aug. 11, 1989 [JP] Japan .................. 1-206824

[51] Int. Cl.⁵ .................. F25B 17/12; F28D 21/00
[52] U.S. Cl. .................. 165/104.12; 165/909; 122/7 R; 62/480
[58] Field of Search .................. 165/104.12, 909; 122/7 R; 62/480

[56] References Cited

U.S. PATENT DOCUMENTS

| | | | |
|---|---|---|---|
| 2,681,047 | 6/1954 | Dalin et al. | 122/DIG. 2 |
| 4,616,692 | 10/1986 | Yasuda et al. | 62/480 |
| 4,881,376 | 11/1989 | Yonezawa et al. | 62/480 |

FOREIGN PATENT DOCUMENTS 226678 11/1985 Japan .................. 165/104.12

Primary Examiner—Albert W. Davis, Jr.
Attorney, Agent, or Firm—Antonelli, Terry Stout & Kraus

[57] ABSTRACT

An apparatus for heat recovery from an exhaust gas with waste heat from a heat machinery unit, which comprises a pair of first and second chemical heat-storing units, each comprising a vessel containing a reactant material capable of releasing a reaction-susceptible material upon heating with an exhaust gas and emitting the heat of reaction upon combination with the reaction-susceptible material and a heat exchanger piping provided in the vessel and through which a heat transfer medium is passed. The high temperature gas from the heat machinery unit is applied to the vessel in one of the first and second chemical heat-storing units, thereby resulting in a reaction for leasing the reaction-susceptible material. A further reaction to combine the heat-susceptible material in the vessel in the other of the first or second chemical heat-storing units, and is passed the heat transfer medium through the heat exchanger piping in the vessel in the other of the first or second chemical heat-storing unit for continuously providing a high heat recovery efficiency.

2 Claims, 14 Drawing Sheets

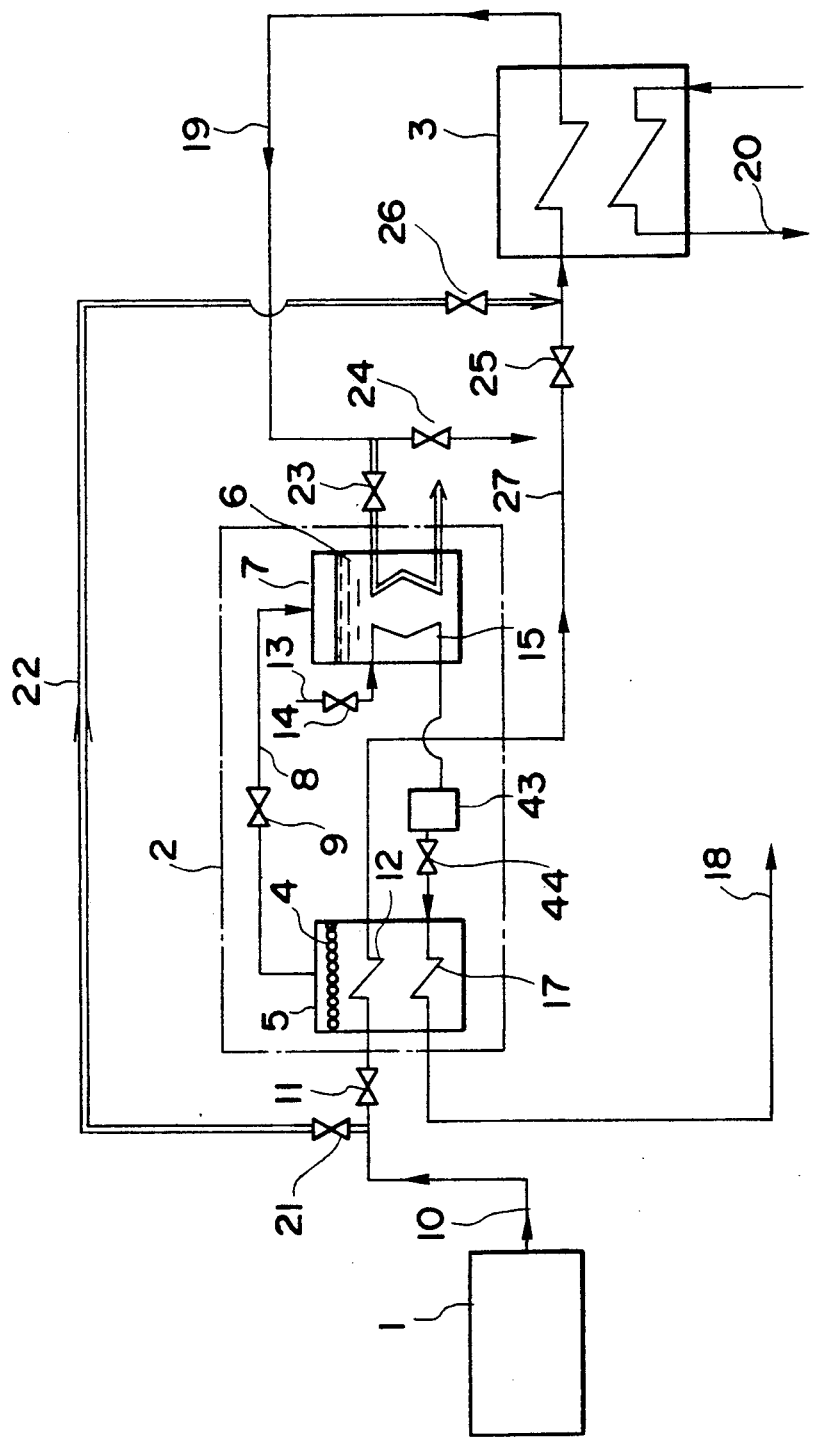

FIG.11

| NO. | REACTANT MATERIAL | REACTION-SUSCEPTIBLE MATERIAL | REACTION EQUATION |
|---|---|---|---|
| 1 | $Ca(OH)_2$ (s) | $H_2O$ (g) | $Ca(OH)_2\,(s) \rightleftharpoons CaO\,(s) + H_2O\,(g)$ |
| 2 | $MgCl_2 \cdot 4H_2O$ (s) | $H_2O$ (g) | $MgCl_2 \cdot 4H_2O\,(s) \rightleftharpoons MgCl_2 \cdot 2H_2O\,(s) + 2H_2O\,(g)$ |
| 3 | $NiCl_2 \cdot 6NH_3$ (s) | $NH_3$ (g) | $NiCl_2 \cdot 6NH_3\,(s) \rightleftharpoons NiCl_2 \cdot 2NH_3\,(s) + 4NH_3\,(g)$ |
| 4 | $CaCl_2 \cdot 8NH_3$ (s) | $NH_3$ (s) | $CaCl_2 \cdot 8NH_3\,(s) \rightleftharpoons CaCl_2 \cdot 2NH_3\,(s) + 6NH_3\,(s)$ |
| 5 | $CaCl_2 \cdot 6CH_3NH_2$ (s) | $NH_3\,NH_2$ (g) | $CaCl_2 \cdot 6CH_3NH_2\,(s) \rightleftharpoons CaCl_2 \cdot 2CH_3NH_2\,(s) + 4NH_3\,NH_2\,(g)$ |
| 6 | $CaCl_2 \cdot 2CH_2OH$ (s) | $CH_3OH$ (g) | $CaCl_2 \cdot 2CH_2OH\,(s) \rightleftharpoons CaCl_2\,(s) + 2CH_3OH\,(g)$ |
| 7 | $CaNi_5H_4$ (s) | $H_2$ (g) | $CaNi_5H_4\,(s) \rightleftharpoons CaNi_5\,(s) + 2H_2\,(g)$ |
| 8 | $LaNi_5H_6$ (s) | $H_2$ (g) | $LaNi_5H_6\,(s) \rightleftharpoons LaNi_5\,(s) + 3H_2\,(g)$ |

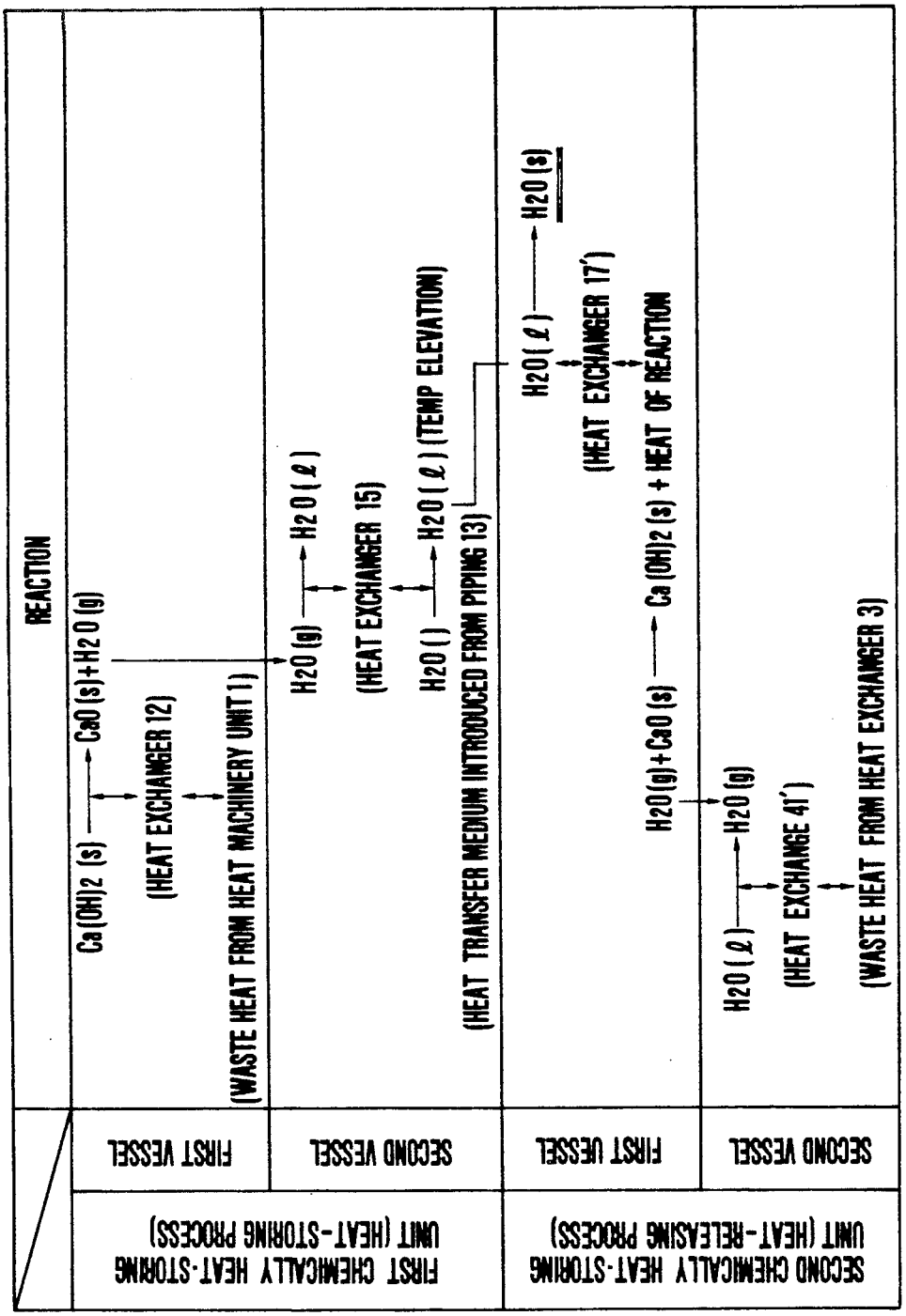

APPARATUS FOR HEAT RECOVERY AND METHOD FOR OPERATING THE APPARATUS

BACKGROUND OF THE INVENTION

This invention relates to an apparatus for heat recovery and a method for operating the apparatus, and more particularly to an apparatus for heat recovery based on an appropriate use of a chemical heat-storing unit, and a method for operating the apparatus.

Heat recovery techniques based on utilization of waste heat from various plants have been so far disclosed. For example, "Kogyo Zairyo (Industrial Materials)" Vol. 32, No. 5, discloses A working principle of a heat pump based on a reversible reaction of $Ca(OH)_2$/CaO system as a chemically heat-storing unit in FIG. 8 in an article entitled "Research and Development of Heat Utilization and Heating Technique and Approach to Their Practical Application." The chemical heat-storing unit disclosed proposes heat recovery based on a conversion reaction, for example, between quick lime CaO and slaked lime $Ca(OH)_2$, allowing a reversible reaction in principle, but the proposed chemical heat-storing unit has problems as a practical apparatus. The first problem is that continuous heat recovery is not taken into consideration; the second is that it is not designed to output the stored energy at an appropriate time when needed, and the third is that no consideration is given specifically to what kind of plant the proposed chemically heat-storing unit should be combined with.

SUMMARY OF THE INVENTION

An object of the present invention is to provide an apparatus for heat recovery comprising a practical chemical heat-storing unit solving the above-mentioned problems and a method for operating the apparatus.

In order to continuously carry out heat recovery, the present apparatus comprises a pair of first and second chemical heat-storing units, each comprising a vessel containing a reactant material capable of releasing a reaction-susceptible material upon heating with an exhaust gas and emitting the heat of reaction upon combination with the reaction-susceptible material and a heat exchanger piping provided in the vessel and through which a heat transfer medium is passed; a first means for applying the high temperature gas from the heat machinery unit to the vessel in one of the first and second chemical heat-storing units, thereby occasioning reaction to release the reaction-susceptible material; a second means for occasioning reaction to combine with the heat-susceptible material in the vessel in the other first or second chemical heat-storing unit; and a third means for passing the heat transfer medium through the heat exchanger piping in the vessel in the other first or second chemical heat-storing unit.

In order to output the stored energy when needed, the present apparatus for heat recovery comprises a chemical heat-storing unit comprising a first vessel containing a reactant material capable of releasing a reaction-susceptible material upon heating with a high temperature gas and emitting the heat of reaction upon combination with the reaction-susceptible material, a second vessel containing the reaction-susceptible material, a piping connecting the first vessel to the second vessel, a heat exchanger piping provided in the first vessel and through which a heat transfer medium is passed and a means for introducing a low temperature gas resulting from heat exchange into the second vessel; and a bypass means for bypassing the high temperature gas from a heat machinery unit around the chemical heat-storing unit.

As a specific plant embodying the present invention, the present apparatus for heat recovery comprises a heat machinery unit evolving a high temperature gas; first and second chemical heat-storing units, each comprising a first vessel containing a reactant material capable of releasing a reaction-susceptible material upon heating with the high temperature gas and emitting the heat of reaction upon combination with the reaction-susceptible material, a second vessel containing the reaction-susceptible material, a piping connecting the first vessel to the second vessel, a heat exchanger piping provided in the first vessel and through which a heat transfer medium is passed, and a gas duct provided in the second vessel; a heat exchanger for heat exchange with an effluent gas from the first vessels in the first and second chemical heat-storing units; a first means for applying the high temperature gas from the heat machinery unit to the first vessel in one of the first and second chemical heat-storing units, a second means for applying the low temperature gas resulting from heat exchange in the heat exchanger to the gas duct in the second vessel in the other first or second chemical heat-storing unit, and a third means for passing the heat transfer medium through the heat exchanger piping in the first vessel in the other first or second chemical heat-storing unit.

In the above apparatuses for heat recovery constructed in accordance with of the present invention, continuous operation can be carried out while outputting the stored energy when needed.

BRIEF DESCRIPTION OF THE DRAWINGS

FIG. 11 is a table showing combinations of reactant materials with reaction-susceptible materials and their reaction equations.

FIG. 12 is a table showing reactions taking place in a pair of chemical heat-storing units.

DETAILED DESCRIPTION OF THE PREFERRED EMBODIMENTS

Figure 1:
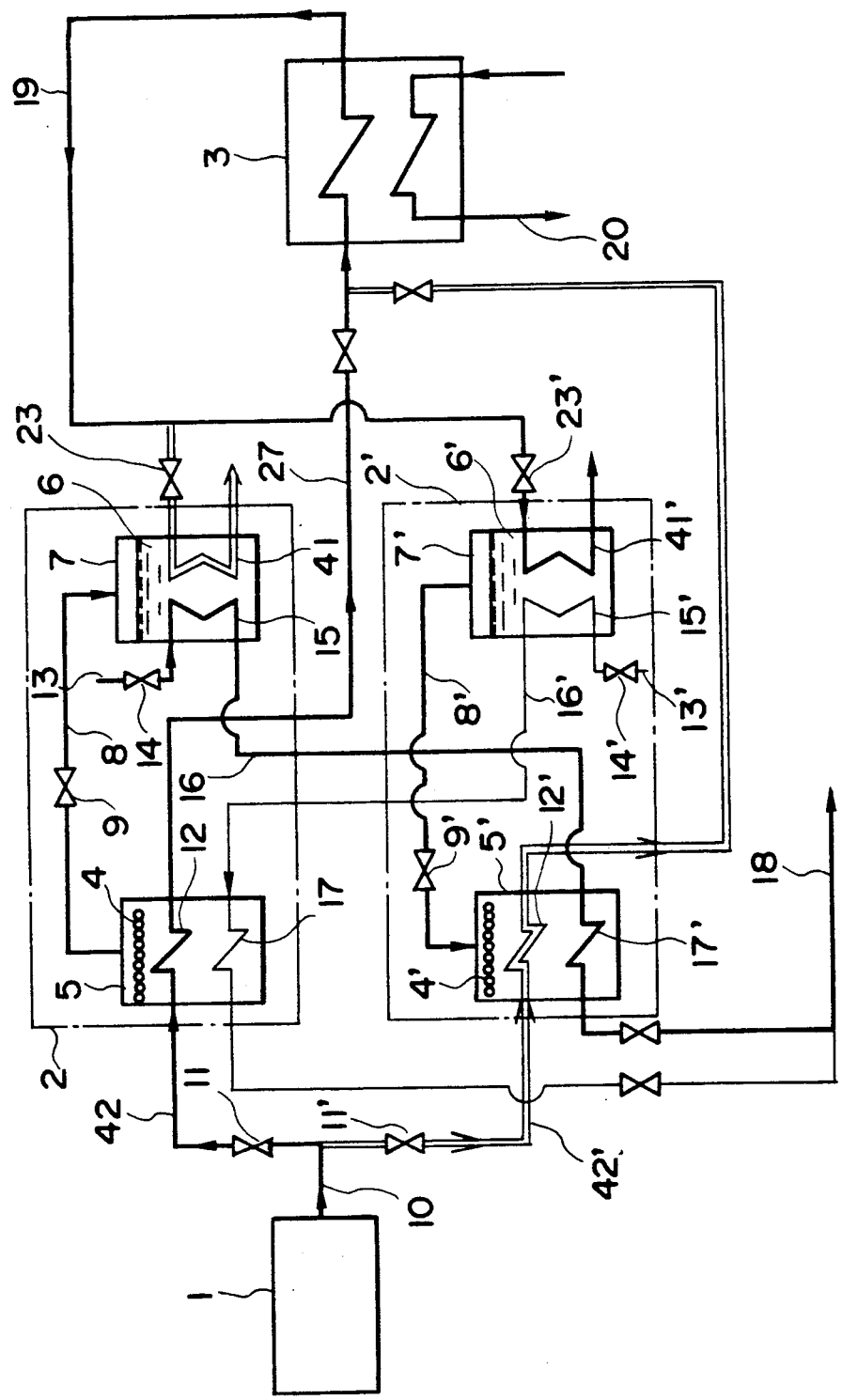
FIG. 1 is a schematic view of one embodiment of the present invention.

One embodiment of the present invention will be explained in detail below, referring to FIG. 1. The main members of the structure shown in FIG. 1 are a heat machinery unit 1 producing an exhaust gas with waste heat, a plurality of chemical heat storing units (a first chemical heat-storing unit 2 and a second chemical heat-storing unit 2' in FIG. 1), and a heat exchanger 3. As the heat machinery unit 1, for example, a gas turbine, etc. can be used, and as the heat exchanger 3, a waste heat recovery boiler, etc. can be used.

On the other hand, the chemical heat-storing unit 2 (2') comprises a first vessel 5 (5') containing a reactant material 4 (4') such as lime, etc. and heat exchangers 12 (12') and 17 (17'), a second vessel 7 (7') containing a reaction-susceptible material 6 (6') such as water, etc. and heat exchangers 15 (15') and 41 (41'), a piping 8 (8') communicating the first vessel 5 (5') with the second vessel 7 (7'), a valve 9 (9') provided in the piping 8 (8'), a piping 13 (13') for introducing a heat transfer medium such as water, etc. from the outside through the second vessel 7 (7'), and a valve 14 (14') provided in the piping 13 (13').

Other members constituting the structure shown in FIG. 1 are a piping 42 (42') connecting the heat machinery unit 1 to the chemical heat-storing unit 2 (2') and a valve 11 (11') provided in the piping 42 (42'); a piping 16 (16') connecting the first vessel 5 (5') in one chemical heat-storing unit 2 (2') to the second vessel 7' (7) in the other chemical heat-storing unit 2' (2); a piping 18 for outputting the generated heat in the form of steam, etc. from the chemical heat-storing units 2 (2'); a piping 19 connecting the heat exchanger 3 to the second vessel 7 (7') in the chemical heat-storing unit 2 (2') and a valve 23 (23') provided in the piping 19: and a piping 20 for outputting the generated heat source in the form of steam, etc. from feed water, etc. at the heat exchanger 3.

In FIG. 1, the structure of the individual chemical heat-storing unit itself embodies a single apparatus for heat recovery, and also the entire structure shown in FIG. 1 embodies an apparatus for heat recovery as an integrated plant. Thus, the structure of the chemical heat-storing unit itself will be hereinafter referred to as an apparatus for heat recovery or a chemical heat-storing unit and the entire structure including those of the chemical heat-storing units will be hereinafter referred to as an integrated plant. Eight samples of the reactant material and the reaction-susceptible material for use in the chemical heat-storing unit 2 (2') are shown in FIG. 11, which corresponds to Table 1 in the abovementioned "Kogyo Zairyo" (Industrial Materials). Among the combinations, explanation will be made of combination No. 1, where the reactant material is Ca(OH)$_2$ and the reaction-susceptible material is H$_2$O. In the first vessel 5 (5'), the following reversible reaction takes place:

$$Ca(OH)_2 \rightleftharpoons CaO + H_2O \tag{1}$$

More particularly, the reactant material Ca(OH)$_2$ undergoes the reaction to separate Ca(OH)$_2$ into CaO and H$_2$O when heated and, among the product components, H$_2$O is led to the second vessel 7 (7'). From H$_2$O from the second vessel 7 (7') and CaO, Ca(OH)$_2$ is formed. The reaction between the reactant material and the reaction-susceptible material takes place likewise in other combinations. In these equations shown in FIG. 11, the symbols (s), (l) and (g) in at the respectively represent the material in a solid form, a liquid form and a gaseous form, respectively.

In FIG. 1, the reactant material is filled in the first vessel 5 (5') in the chemical heat-storing unit 2 (2') and the reaction-susceptible material 6 (6') is filled in the second vessel 7 (7').

When the reaction to release the reaction-susceptible material is carried out in the first chemical heat-storing unit 2 in the integrated plant, the integrated plant is so operated as to occasion the reaction to form the reactant material in the second chemical heat-storing unit 2'. That is, an exhaust gas from the heat machinery unit 1 passes through the pipe route +10–11+42,+12,+27,+3,+19,+23,'+41,' in FIG. 1 and water passes through the pipe route 13+14,+15,+17,'+18, to produce steam. Furthermore, steam is obtained from feedwater through the piping 20 of heat exchanger 3. Neither exhausted gas nor water is supplied to other pipings, etc. than the above-mentioned lines.

More detailed explanation will be made below of its operations. Exhaust gas 10 with waste heat from the heat machinery unit 1 is led to the chemical heat-storing unit 2 by opening the valve 11 and closing the valve 11'. Now, let the first chemical heat-storing unit 2 perform a heat-storing process (reaction to release the reaction-susceptible material) and the second chemical heat-storing unit 2' perform a heat-releasing process (reaction to form the reactant material). The exhaust gas 10 with waste heat is led into the heat exchanger 12 provided in the reactant material 4 in the first vessel 5, whereby the reactant material 4 is heated to release the reaction-susceptible material adsorbed or absorbed in the reactant material 4. The released reaction-susceptible material in a gaseous or vapor form is supplied to the second vessel 7 through the piping 8 and cooled and condensed to give the heat of condensation to the water led from the piping 13 as the heat transfer medium. For example, slaked lime Ca(OH)$_2$ as the reactant material 4 is heated in the first vessel 5 to release H$_2$O vapor as the reaction-susceptible material, while gradually changing itself to quick line CaO. The heat of H$_2$O vapor introduced into the second vessel 7 is effectively utilized in the following manner: after passage through the piping 13 and the valve 14, the heat transfer medium such as water, air, etc. is led into the heat exchanger 15 in the second vessel 7. The H$_2$O vapor introduced into the second vessel 7 is condensed by the heat transfer medium, whereby the heat transfer medium is heated. Then, the heated heat transfer medium is led to the heat exchanger 17' in the first vessel 5' in the second chemical heat-storing unit 2' through the piping 16.

In the second chemical heat-storing unit 2', the exhaust gas is introduced into the second vessel 7' in the heat release process to heat the reaction-susceptible material, i.e. water, in the second vessel 7'. Thus, the reaction-susceptible material 6' in the second vessel 7' is gasified or vaporized and the resulting water vapor is led to the first vessel 5' through the piping 8' to form the reactant material 4'. At that time, the reactant material 4' is heated to a considerably high temperature by the heat of reaction, and the heat transfer medium led to the heat exchanger 17' is heated to a considerably high temperature by the heat of reaction to form superheated steam or saturated steam. The temperature of the heat transfer medium is higher than that of exhaust gas 10, and the heat energy of the heat transfer medium is to be effectively utilized through the outlet piping 18. For the necessary heat for the gasification of the reaction-susceptible material 6' in the second vessel 7' in the second chemical heat-storing unit 2', the waste heat of the exhaust gas from the heat exchanger 12 provided in the first vessel 4 is utilized through the duct 19 and the valve 23 after heat exchange in the heat exchanger 3.

The heat energy recovered through the heat exchanger 3 is effectively utilized through the piping 20. For example, the steam obtained through the pipings 18 and 20 is given to a steam turbine, etc. (not shown in the drawing).

The foregoing explanation has been made by presuming the first chemical heat-storing unit to perform the heat-storing process and the second heat-storing unit to perform the heat-releasing process. The reaction discontinues when all of slaked lime $Ca(OH)_2$ is converted to quick lime CaO or when CaO is converted to $Ca(OH)_2$, and no further reaction proceeds at all. At that time, valve 11(11'), valve 14 (14'), valve 23 (23'), etc. are switched to make the first chemical heat-storing unit perform the heat-releasing process and the second chemical heat-storing unit perform the heat-storing process in FIG. 1., and thus continuous operation can be made by appropriate switching of the valves.

FIG. 12 schematically shows types of reaction and modes of heat transfer in the first and second vessels in the first and second chemical heat-storing units on the presumption that the first chemical heat-storing unit 2 performs the heat storing process and the second chemical heat-storing unit 2' performs the heat-releasing process.

In the first vessel 5 in the first chemical heat-storing unit 2, the reactant material $Ca(OH)_2$ is heated by a high temperature gas from the heat machinery unit 1 to separate Ca(OH)2 into CaO(s) and water vapor $H_2O(g)$ at a high temperature. The water vapor $H_2O(g)$ is heat exchanged with the heat transfer medium, for example, $H_2O(l)$, introduced through the piping 13 in the second vessel 7, to form $H_2O(l)$, whereas the heated heat transfer medium $H_2O(l)$ is led to the first vessel 5' in the second chemical heat-storing unit 2' through the piping 16. In the second vessel 7' in the second chemical heat-storing apparatus 2', the low temperature gas from the heat exchanger 3 after the heat recovery therein is led to the heat exchanger 41' to heat the reaction-susceptible material 6', for example, $H_2O(l)$, in the second vessel 7 to generate water vapor $H_2O(g)$. The generated water vapor $H_2O(g)$ is led to the first vessel 5' through the piping 8' to generate a large amount of the heat of reaction in the process of forming $Ca(OH)_2(s)$ from $H_2O(g)$ and CaO(s). The heat of reaction is given to the heat transfer medium $H_2O(l)$ supplied from the second vessel 7 in the first chemical heat-storing unit 2 to heat the heat transfer medium $H_2O(l)$ to $H_2O(g)$. The heat of reaction emitted is high enough to make $H_2O(g)$ saturated steam or superheated steam utilizable in a steam turbine, etc. (not shown).

According to the embodiment of FIG. 1, the integrated plant as a whole can be operated not only in a high efficiency, but also continuously by appropriate switching of operating mode of the first and second chemical heat-storing units 2 and 2', that is, from the heat-storing process to the heat-releasing process or vice verse.

Figure 2:
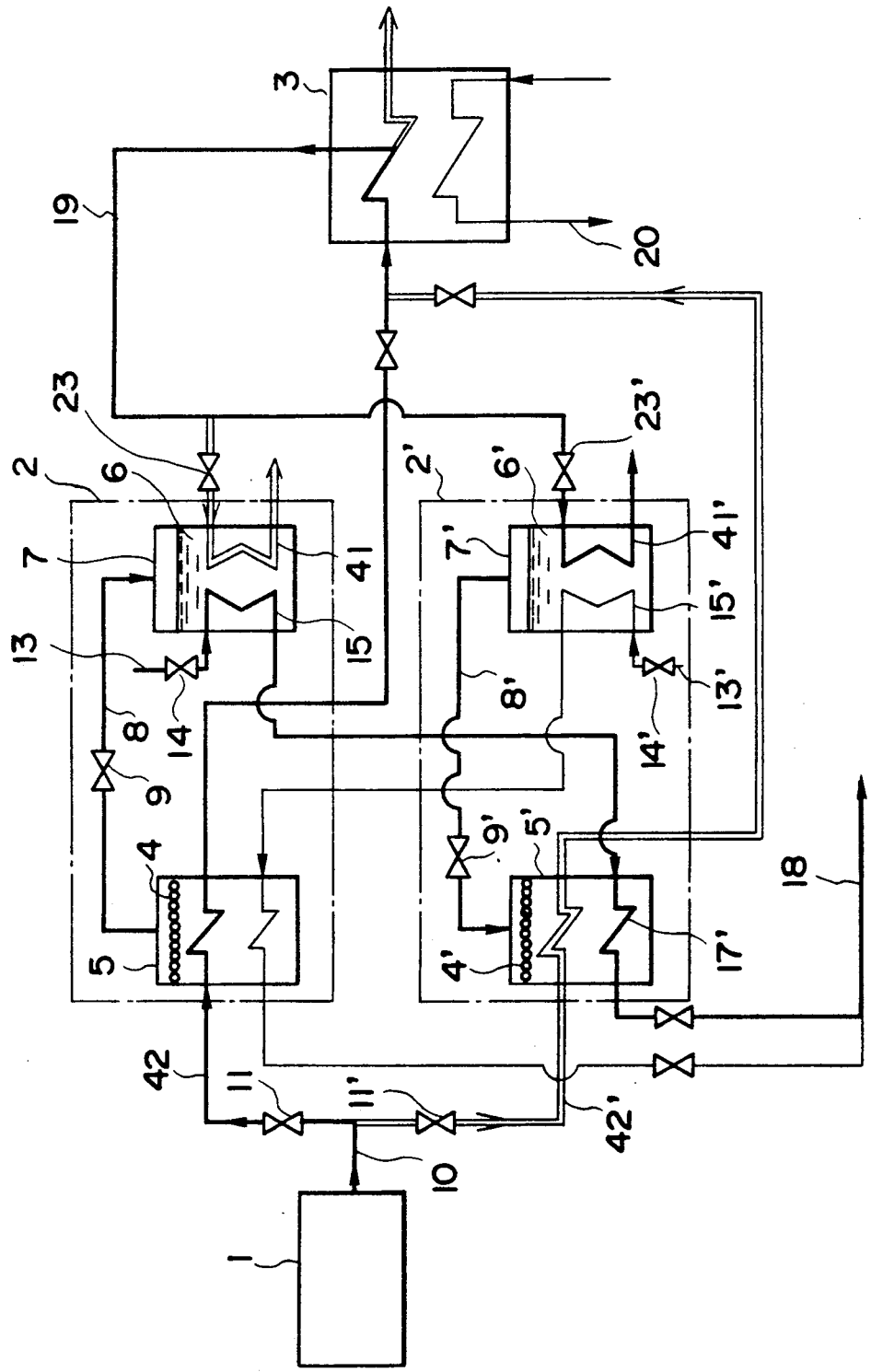
FIGS. 2 to 4 are schematic view of alternate embodiments constructed in accordance with the present invention.

FIG. 2 shows one modification of the embodiment shown in FIG. 1, where the necessary heat source for gasification of reaction-susceptible materials 6 (6') in the second vessel 7 (7') in the chemical heat-storing unit 2 (2') is withdrawn at the intermediate point of the heat exchanger 3 to obtain the exhaust gas at an appropriate temperature necessary for heating the reaction-susceptible material 6 (6').

Figure 3:
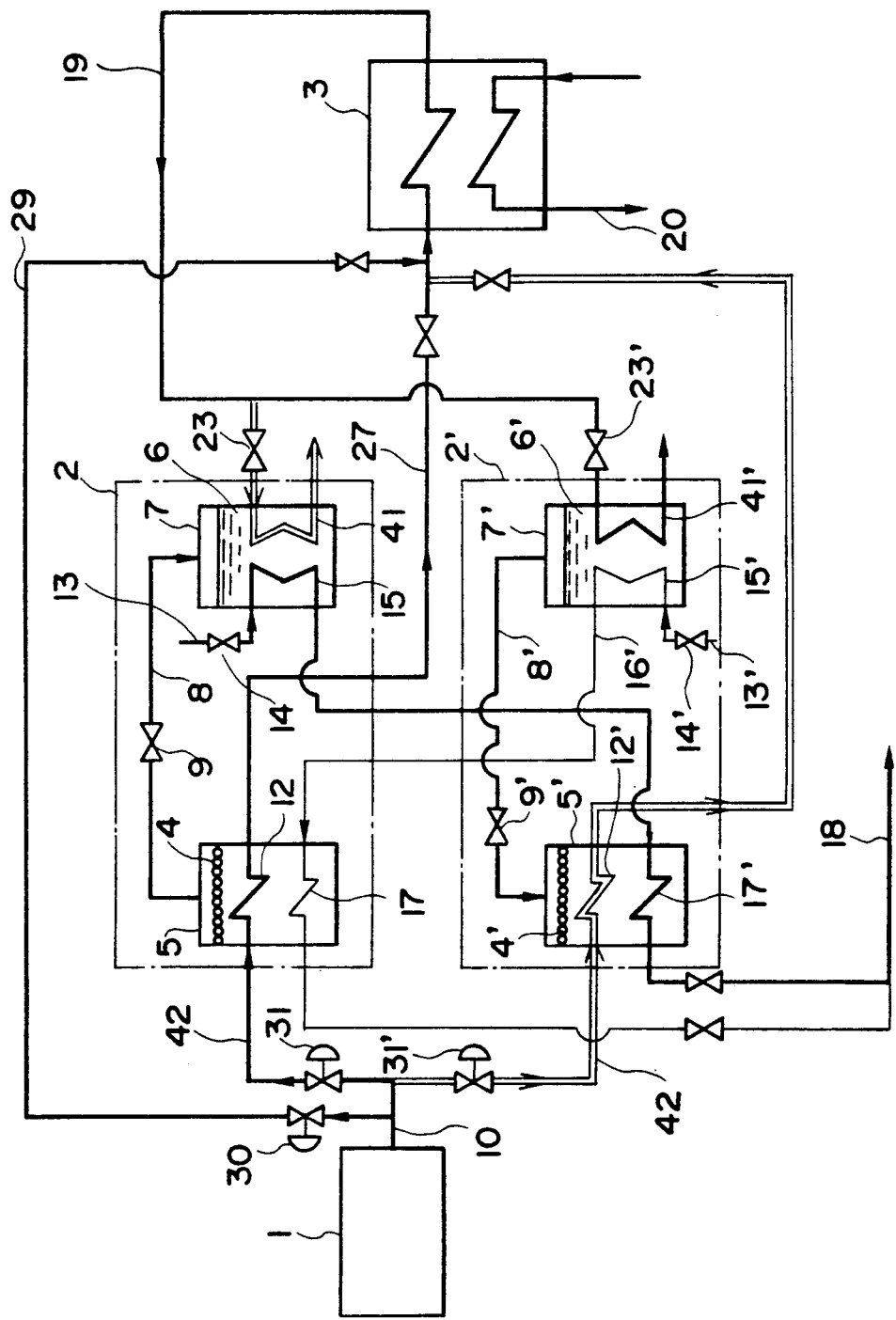

FIG. 3 also shows another modification of the embodiment shown in FIG. 1, where a duct 29 for by-passing the chemical heat-storing unit 2 (2'), a control valve 30 for adjusting the quantity of exhaust gas 10 bypassing the chemical heat-storing unit 2 (2'), and a control valve 31 (31') for adjusting the quantity of exhaust gas 10 to the chemical heat-storing unit 2 (2') are further provided in the embodiment of FIG. 1. According to this modification, user's requirement for heat energy can be effectively met by adjusting the opening degree of control valves 30 and 31 (31').

Figure 4:
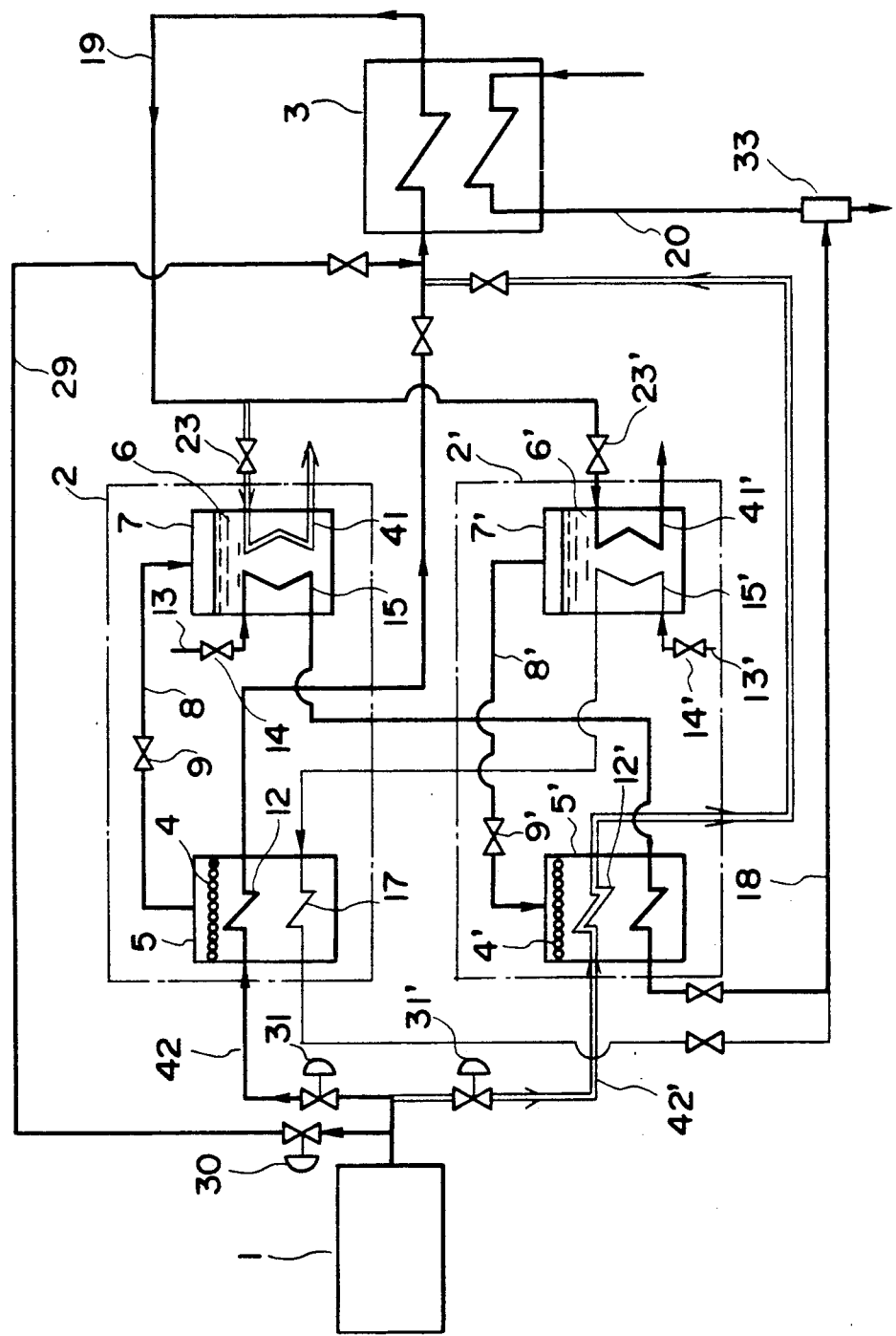

FIG. 4 shows a modification of the embodiment shown in FIG. 3, wherein a mixing unit 33 is further provided for joining the generated heat energy through the piping 18 and the generated heat energy generated through the piping 20 together. User's requirements for heat energy can be effectively met by adjusting the opening degree of control valves 30 and 31 (31').

Figure 5:
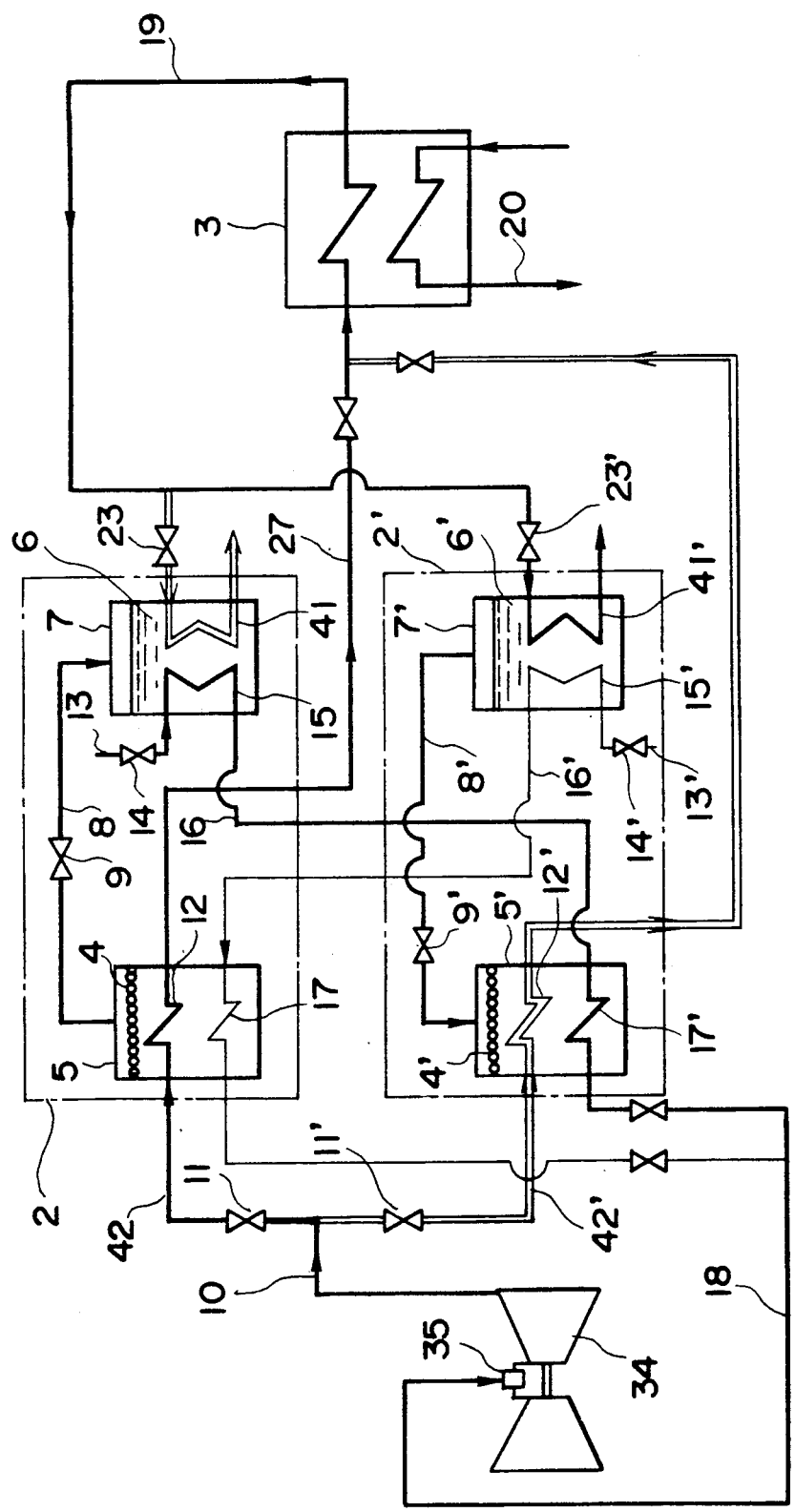
FIG. 5 is a schematic view of a an $NO_x$ reduction (denitration) process using a gas turbine as a heat machinery unit.

FIG. 5 shows further modification of the embodiment shown in FIG. 1, where the heat exchanger 3 is provided with a denitration unit (not shown), and the heat energy steam generated in the chemical heat-storing unit 2 (2') is injected into a combustor 35 of a gas turbine 34 as a heat machinery unit through the piping 18. According to this embodiment, the $NO_x$ content in the exhaust gas from the integrated plant can be effectively reduced in an early period of operation.

The effects of the embodiment shown in FIG. 5 will be explained, referring to

Figure 6:
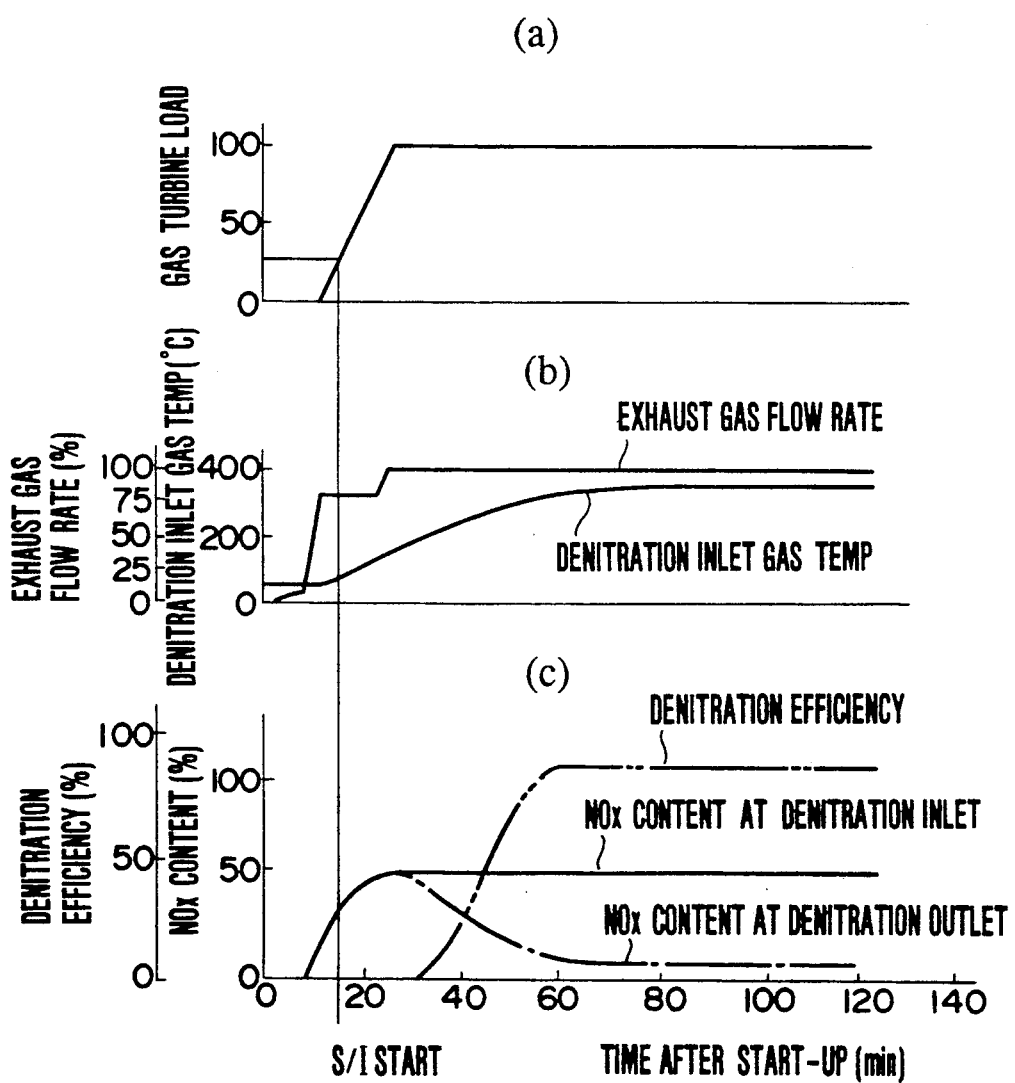
FIGS. 6(a)–6(c) are graphical illustrations of the effects of the process shown in FIG. 5, FIGS. 7 and 8 are schematic views of a denitration process using a waste heat recovery boiler as a heat exchanger.

FIGS. 6(a)–6(c) which illustrate a relationship between a gas turbine load (6(a)), an exhaust gas flow rate and a gas temperature at the inlet to the inlet to the denitration efficiency and an $NO_x$ content (FIGS. 6(a)) with respect to the timing to a start of the steam injection to the gas turbine against the time after the start up of the gas turbine 34 in the embodiment of FIG. 5. In the present invention, the steam generated in the chemical heat-storing unit 2 (2') is used as an injection steam to the gas turbine and thus the timing to start the steam injection can be made earlier to reduce the $NO_x$ content in the exhaust gas from the integrated plant in an early period of operation. For example, it is said that it is right after the startup of a gas turbine that the control of $NO_x$ content in the exhaust gas is in the most strict state in the well known, integrated power plant including a gas turbine, a waste heat recovery boiler and a denitration unit. In that state the gas temperature at the inlet to the denitration unit is low and a considerable time period of, for example 30 to 50 minutes is required until the catalyst reaches the temperature at which the catalyst fully shows a catalytic activity independence though upon the operating mode, and also equal or greater time period is required until the injection steam to the gas turbine is generated from the waste heat recovery boiler. Thus, injection of the steam generated in the chemical heat-storing unit 2 (2') into the gas turbine combustor 35 as shown in the embodiment of FIG. 5 is very effective for reduction in the $NO_x$ content in the exhaust gas from the integrated plant right after the startup of the gas turbine.

Figure 7:
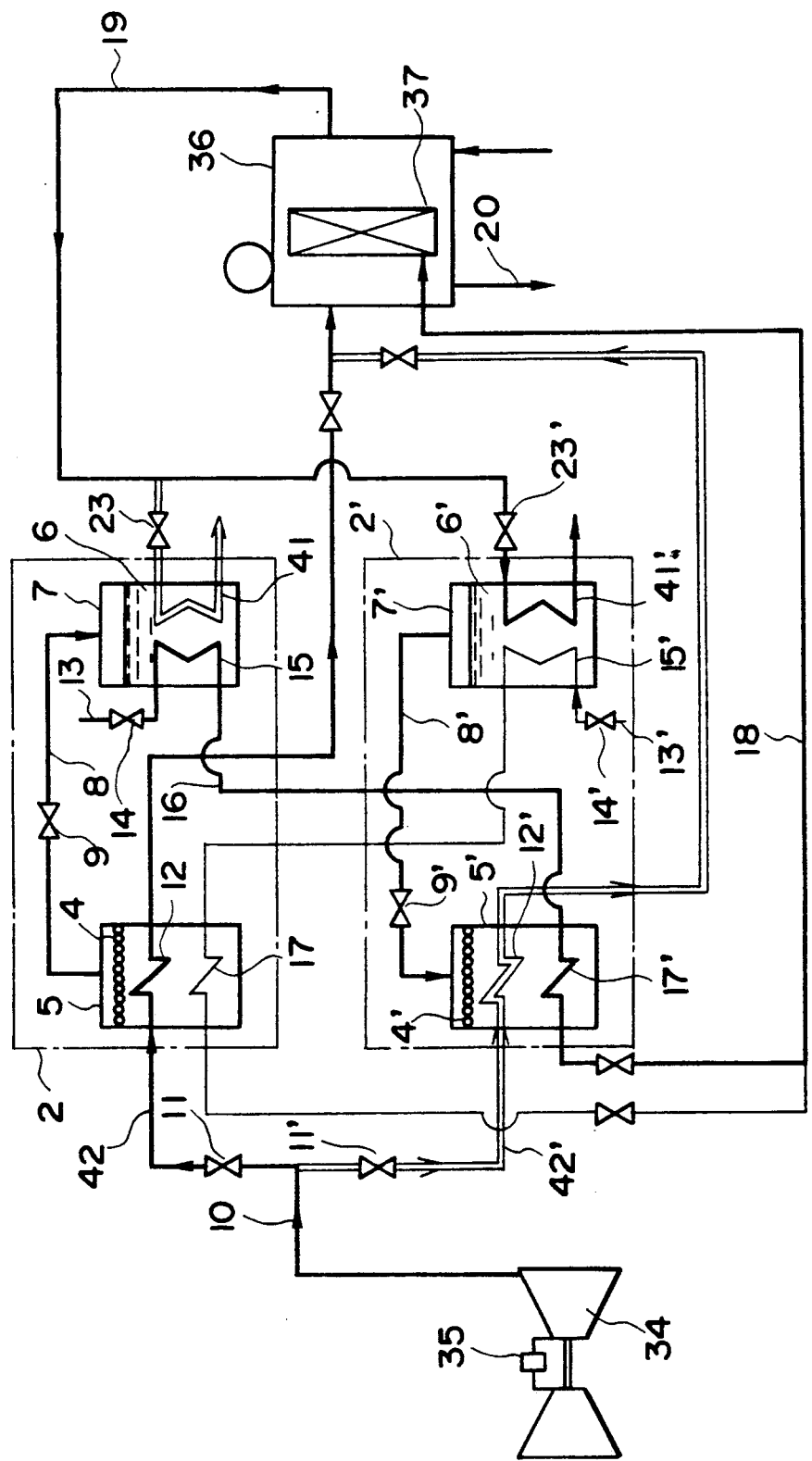

FIG. 7 shows an embodiment for promptly bringing a denitration unit into its effective phase right after the startup of the integrated plant, where the heat energy (steam) generated in the chemical heat-storing unit 2 (2') is used through the line 18 to heat a denitration unit 37. This embodiment is effective for reduction in the $NO_x$ content in the effluent gas from the integrated plant.

Figure 8:
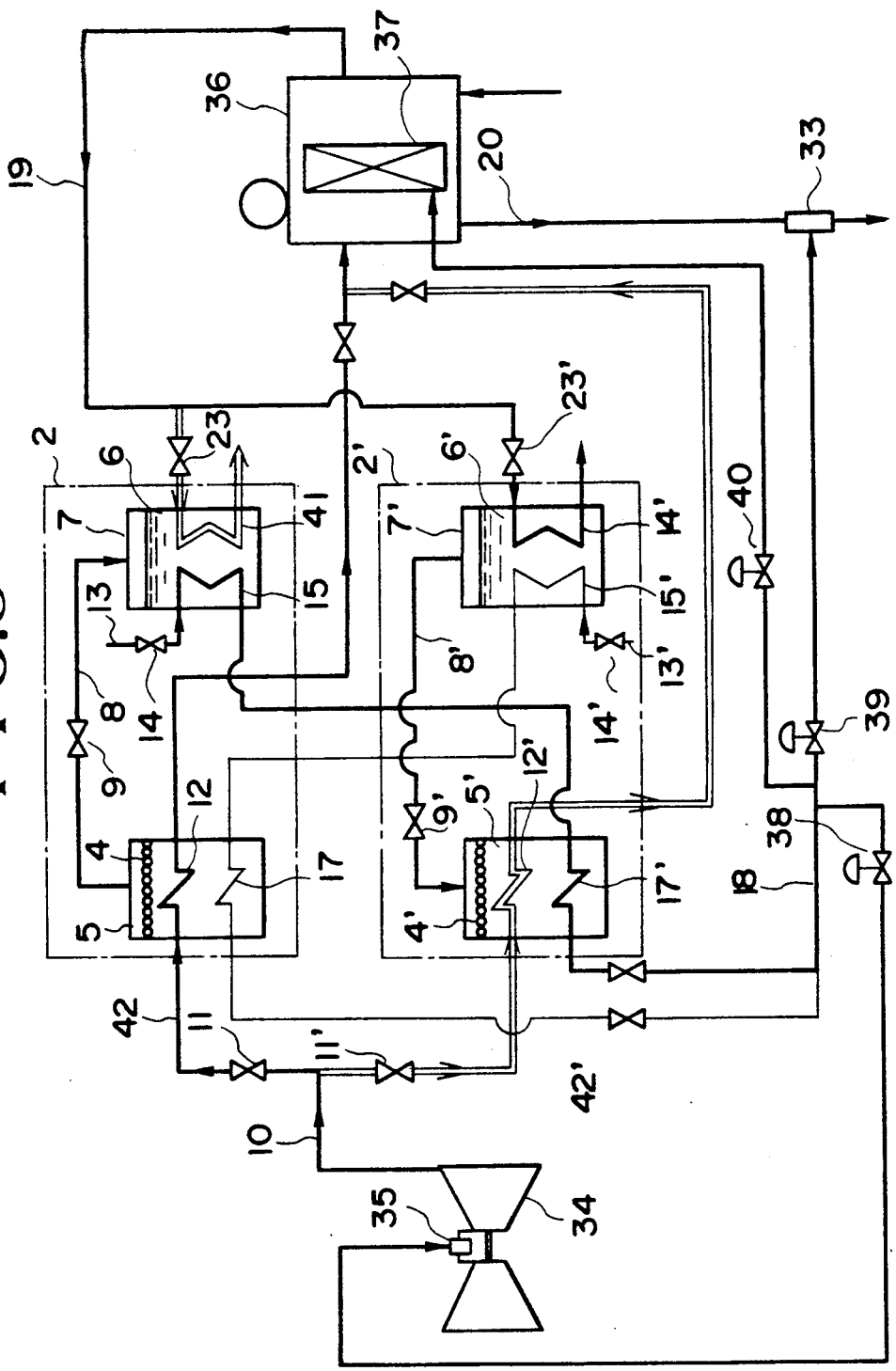

FIG. 8 represents combination of the embodiment of FIG. 5 with FIG. 7, where the heat energy (steam) generated in the chemical heat-storing unit 2 (2') is controlled by adjusting the opening degree of control valves 38, 39 and 40, thereby controlling the steam injection to the gas turbine combustor, heating of the denitration unit and outputting of the heat energy. Thus, this embodiment can meet the reduction in the $NO_x$ content in the effluent gas from the integrated plant and also can meet user's requirements for heat energy.

Figure 9:
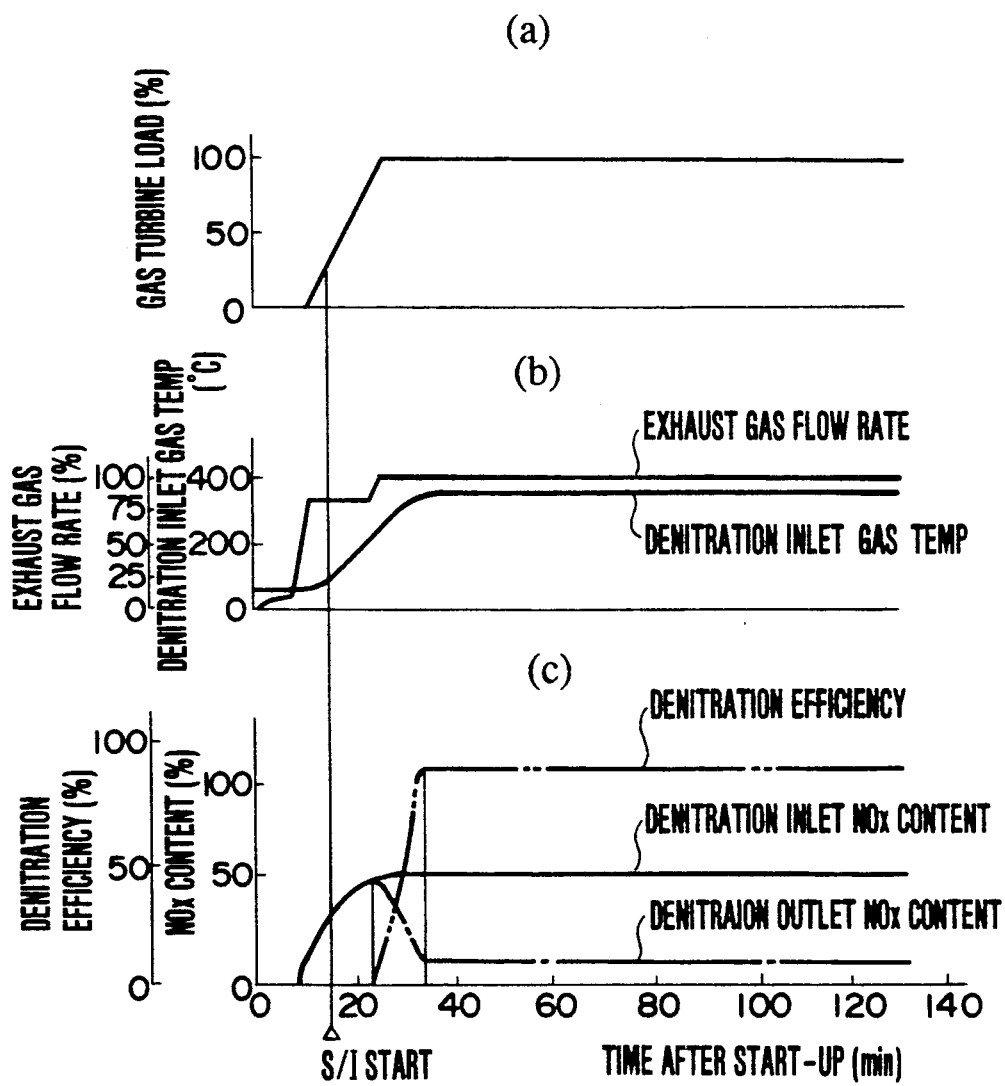
FIGS. 9(a)–(c) are graphical illustrations of the effects of the denitration process shown in FIGS. 7 and 8, FIGS. 10A, 10B and 10C are schematic views showing operations of an apparatus for heat recovery according to another embodiment of the present invention.

FIGS. 9(a)–9(c) illustrate a realtionship between a gas turbine load (FIG. 9(a)), an exhaust gas flow rate and a gas temperature at the inlet to the denitration unit FIG. 9(b), and a denitration efficiency and $NO_x$ content FIG. 9(c) with respect to and the timing to start of the steam injection against the time after startup of the integrated plant in the: embodiment shown in FIG. 8. According to the embodiment of FIG. 8, the timing to start steam injection can be made earlier and the denitration unit can be heated by the steam generated in the chemical heat-storing unit, and thus the $NO_x$ content can be reduced in the effluent gas from the integrated plant.

Figure 10A:
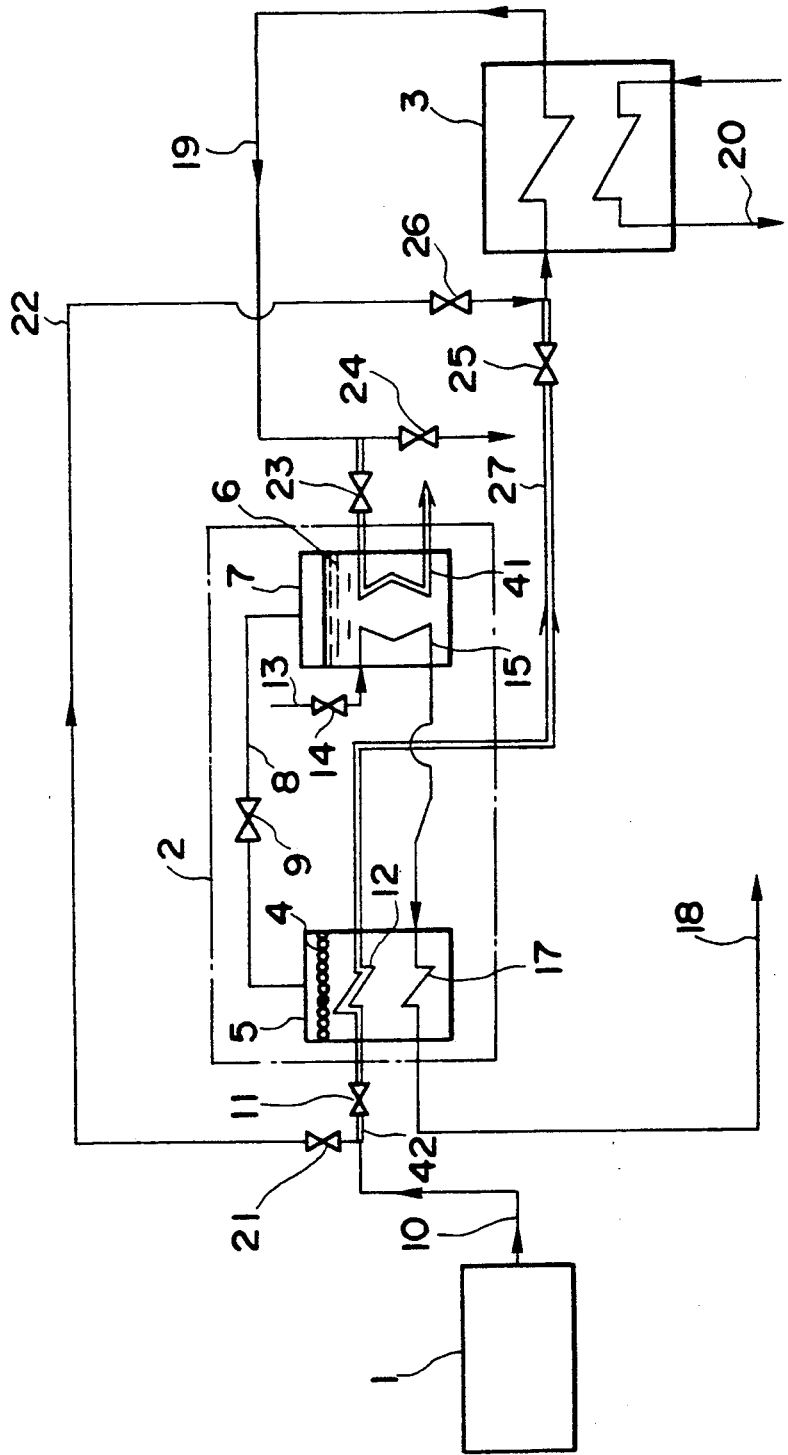
Figure 10C:
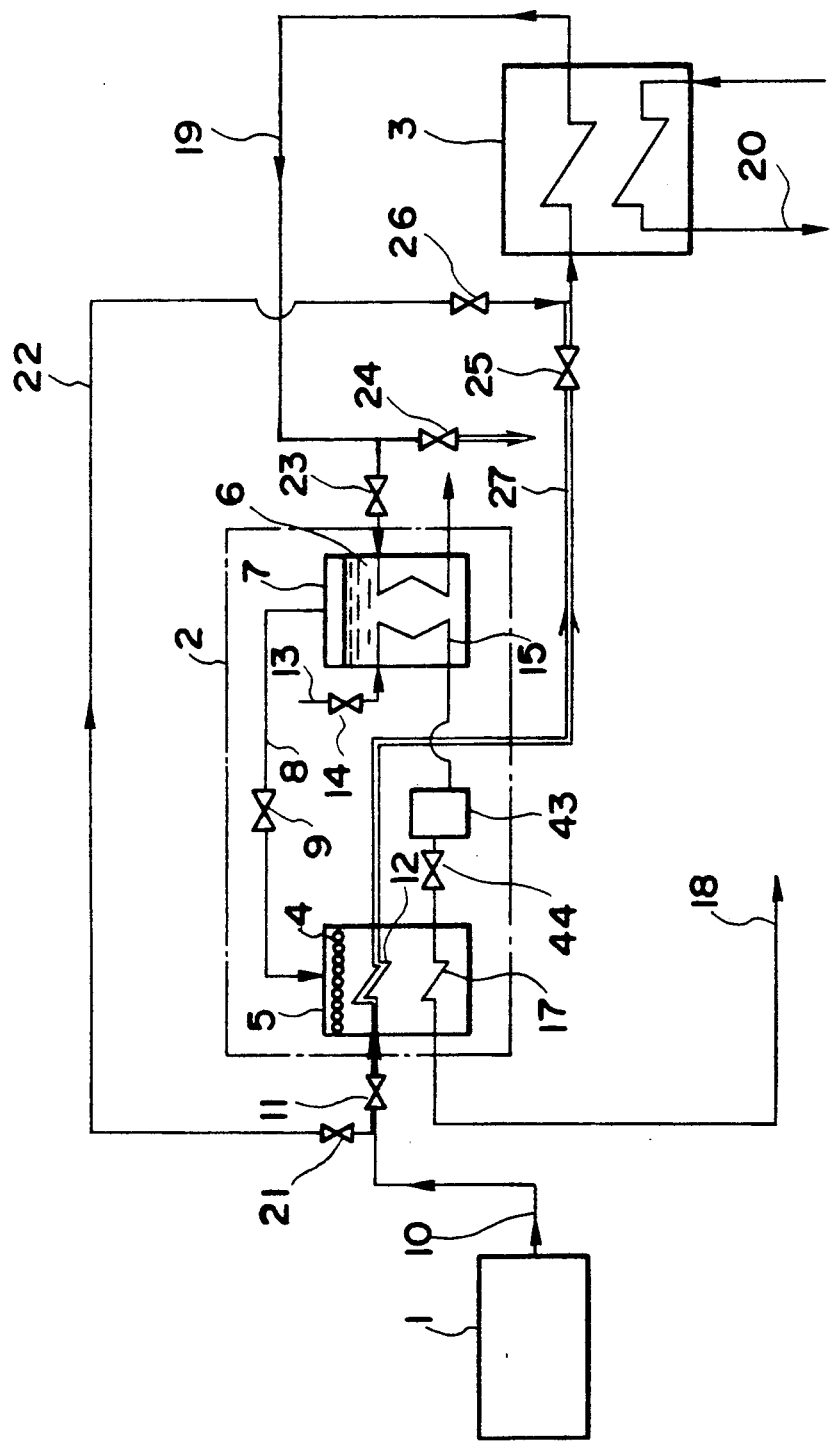

FIG. 10A, 10B and 10C shows modes of operation according to one modification of the embodiment of FIG. 1, where one chemical heat-storing unit 2 is provided together with a bypass duct 22 that bypasses the chemical heat-storing unit 2 and valves 21 and 26 in the duct 22.

In the normal operation mode (FIG. 10A), the exhaust gas 10 with waste heat from the heat machinery unit 1 is led to the heat exchanger 3 through the duct 22 and the valve 26 by closing the valve 11 and opening the valve 21 to conduct heat exchange with feed water passing through the piping 20 and the heat energy recovered through the piping 20 as steam can be effectively utilized. The effluent gas from the heat exchanger 3 is vented to the outside of the system through the duct 19 and the valve 24 to conduct heat recovery only through the heat exchanger 3 and generate steam through the piping 20. When requirements for heat energy are expected to increase, the integrated plant is placed into a preliminary phase (FIG. 10B). That is, the exhaust gas 10 with waste heat is led to the heat exchanger 12 provided in the reactant material 4 in the first vessel 5 in the chemical heat-storing unit 2 by opening the valve 11 and closing the valve 11, thereby heating the reactant material 4. Then, the exhaust gas 10 is led to the heat exchanger 3 through the duct 27 and the valve 25 to conduct heat exchange with feedwater passing through the piping 20, and the heat energy recovered through the piping 20 as steam can be effectively utilized. The effluent gas from the heat exchanger 3 is vented to the outside of the system through the duct 19 and the valve 24. Since the reactant material 4 is heated at that time, the reaction-susceptible material 6 adsorbed or absorbed in the reactant material 4 is released therefrom as a gas or vapor, which is led to the second vessel 7 through the piping 8 and cooled by the heat transfer medium introduced through the piping 13. If a heat energy output is required at the same time when the heated heat transfer medium is introduced into a tank 43 (heat-releasing phase), the exhaust gas passing through the duct 19 is introduced into the second vessel 7 to gasify or vaporize the reaction-susceptible material 6 by opening the valve 21, closing the valve 11, opening the valve 23 and closing the valve 24, as shown in FIG. 10C. Then, the gas or vapor of the reaction-susceptible material 6 is led to the first vessel 5 through the piping 8 and the valve 9 to react with the reactant material 4 and heat the reactant material 4 to a high temperature. In the first vessel 5, the heat transfer medium passing through the valve 44 and the heat exchanger 17 from the tank 43 is converted to superheated vapor or saturated vapor by the heat of reaction evolved, which can effectively meet the increase in the required heat energy through the piping 18.

According to the present invention, heat energy can be obtained at a high temperature from the chemical heat-storing unit and thus more efficient utilization of energy can be attained by using the thus obtained heat energy. Continuous operation can be made or user's requirement for heat energy can be met thereby.

The present invention can be practically applied as an integrated plant to output thermal energy at a high temperature and thus user's requirement for heat energy can be met together with reduction in the $NO_x$ content in the effluent gas from the plant.

What is claimed is:

1. An apparatus for heat recovery from an exhaust gas based on a high temperature gas from a heat machinery unit and a low temperature gas after a heat exchange, the apparatus comprising:

first and second chemical heat-storing units, each of said chemical heat-storing units comprising a first vessel containing a reactant material capable of releasing a reaction-susceptible material upon heating with the high temperature gas and emitting heat of reaction upon combination with the reaction-susceptible material, a second vessel containing the reaction-susceptible material, a piping connecting the first vessel to the second vessel, and a heat exchanger piping provided in the first vessel and through which a heat transfer medium is passed;

a first means for applying the high temperature gas from the heat machinery unit to the first vessel of one of the first and second chemical heat-storing units;

a second means for applying the low temperature gas resulting from heat exchange of the high temperature gas with feedwater to the second vessel of the other of said first or second chemical heat-storing units; and a third means for passing the heat transfer medium through the heat exchanger piping in the first vessel of the other of said first or second chemical heat-storing units.

2. A method for operating an apparatus for heat recovery from waste gas based on a hot temperature gas from a heat machinery unit, the apparatus comprising a first and second chemical heat-storing unit, each of said chemical heat-storing units comprising a first vessel containing a reactant material capable of releasing a reaction-susceptible material upon heating with a high temperature gas and emitting heat of reaction upon combination with the reaction-susceptible material, a second vessel containing the reaction-susceptible material, a piping connecting the first vessel to the second vessel, and a heat exchanger piping provided in the first vessel and through which a heat transfer medium is passed, the method comprising the steps of:

applying the high temperature gas from the heat machinery unit to the first vessel in one of the first and second chemical heat-storing units;

applying the low temperature gas resulting from heat exchange of the high temperature gas with feedwater to the second vessel in the other of said first or second chemical heat-storing units; and passing the heat transfer medium through the heat exchanger piping in the first vessel in the other of said first or second chemical heat-storing units, thereby obtaining the heated heat transfer medium.

* * * * *